No. 877,866. PATENTED JAN. 28, 1908.
W. A. ROBERTSON.
AUTOMATIC PIPE COUPLING FOR CARS.
APPLICATION FILED APR. 10, 1907.
3 SHEETS—SHEET 3.
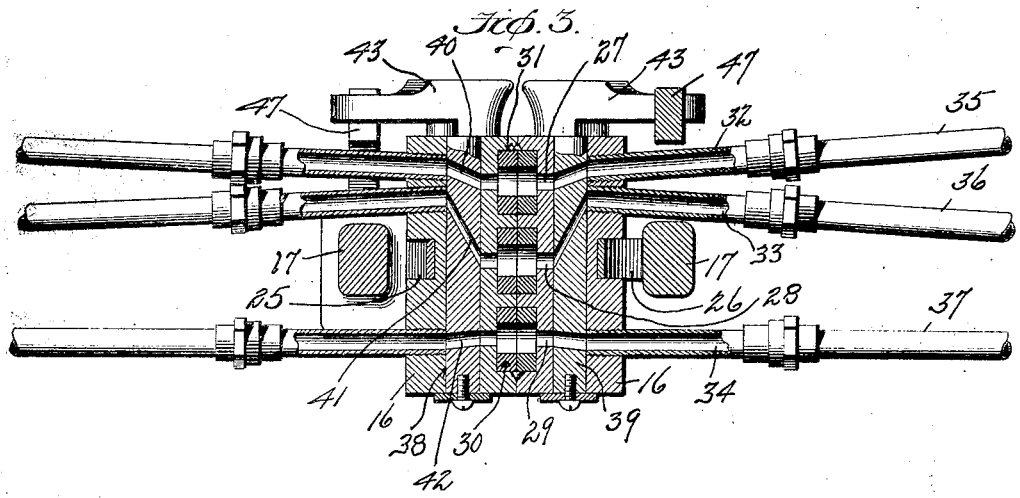
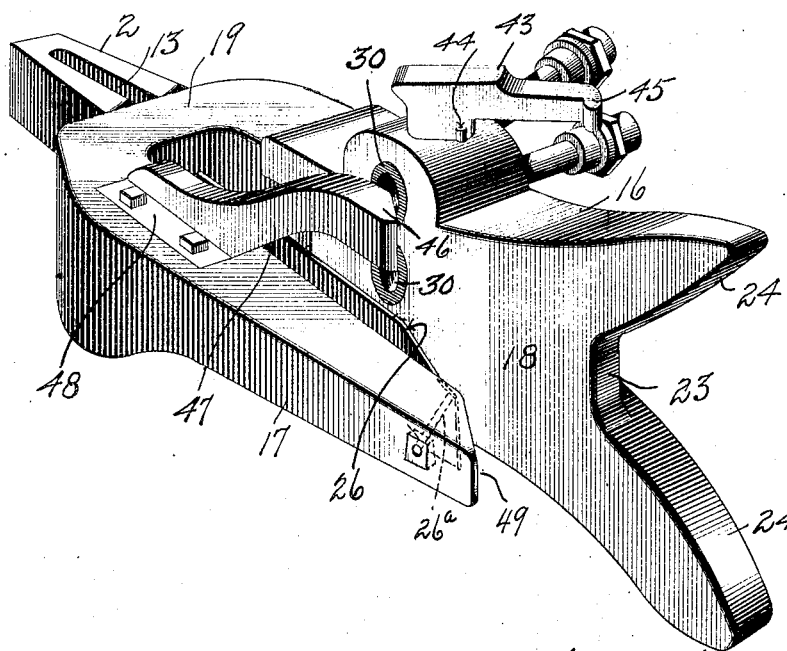
Inventor
William A. Robertson
Witnesses

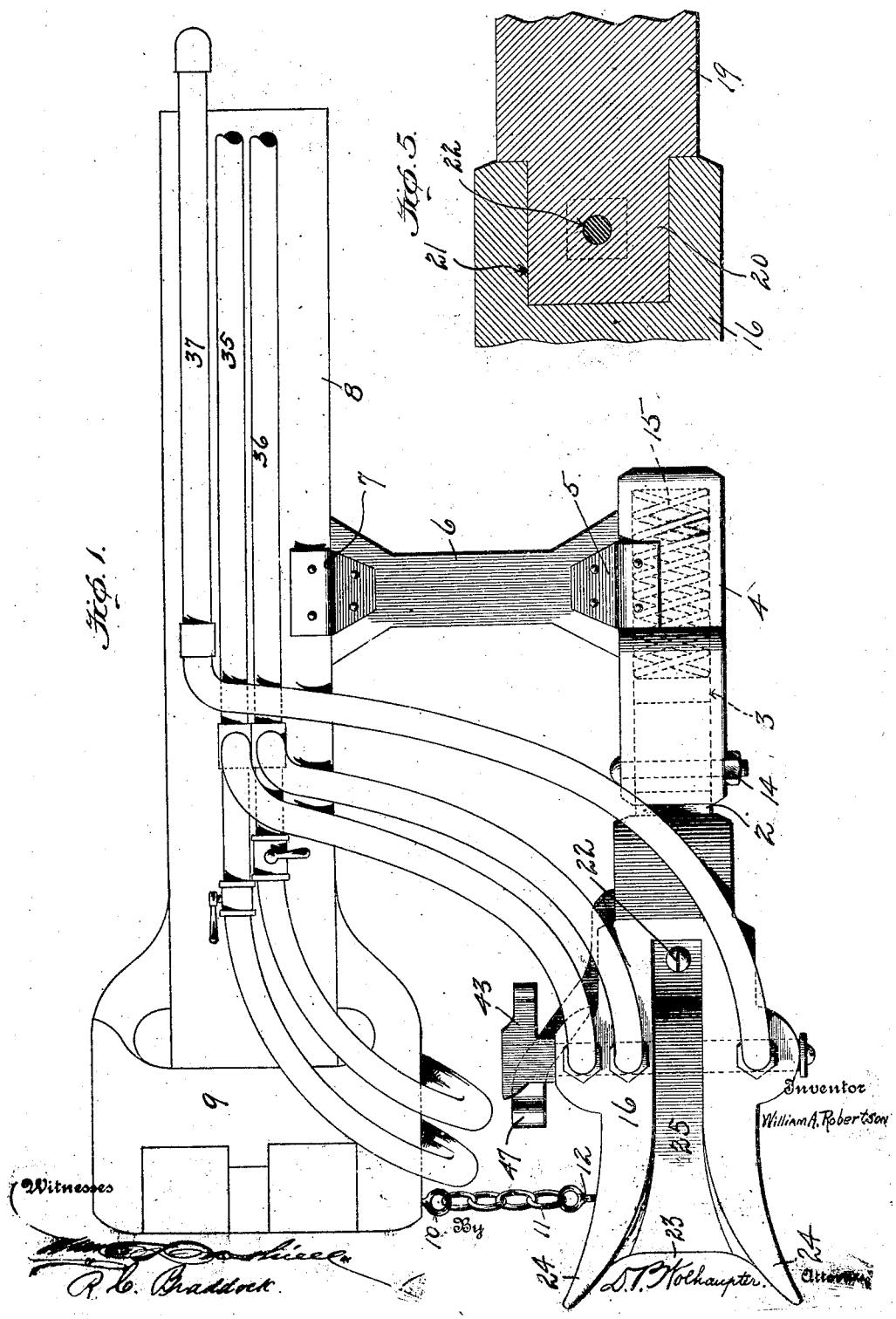

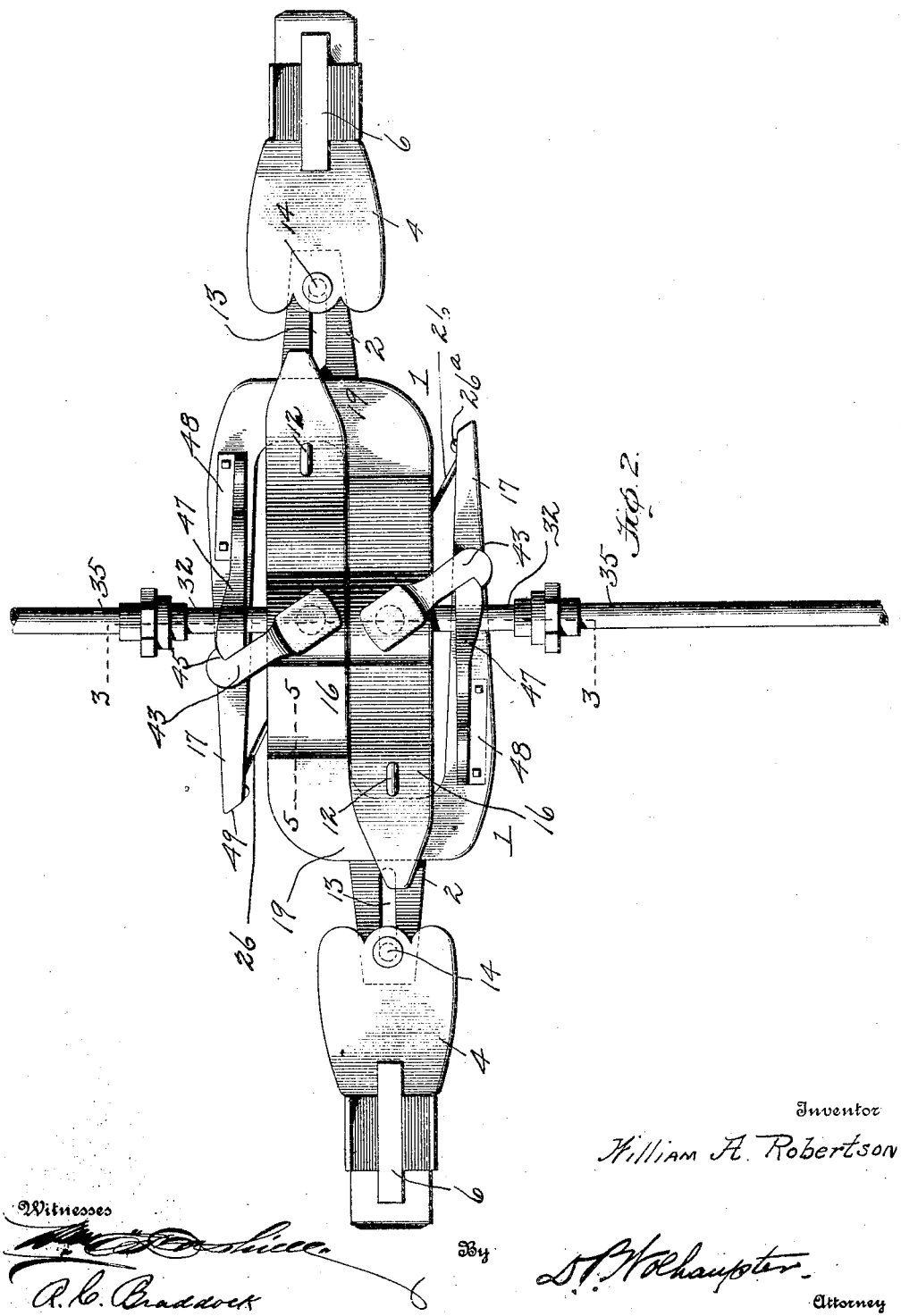

UNITED STATES PATENT OFFICE.

WILLIAM A. ROBERTSON, OF NEWBERN, NORTH CAROLINA, ASSIGNOR OF ONE-FOURTH TO EDWARD W. POU, OF SMITHFIELD, NORTH CAROLINA.

AUTOMATIC PIPE-COUPLING FOR CARS.

No. 877,866.     Specification of Letters Patent.     Patented Jan. 28, 1908.

Application filed April 10, 1907. Serial No. 367,349.

*To all whom it may concern:*

Be it known that I, WILLIAM A. ROBERTSON, a citizen of the United States, residing at Newbern, in the county of Craven and State of North Carolina, have invented a certain new and useful Improvement in Automatic Pipe-Couplings for Cars, of which the following is a specification.

This invention relates to that type of couplings designed for automatically connecting the several pipes, between cars, of a railway train.

To this end the invention contemplates a simple, strong and thoroughly practical automatic pipe coupling for cars operating in conjunction with the car coupling and comprising means for effecting in a positive manner the coupling together of the several pipes of the train, namely, the air brake pipes, the signal pipes and the steam pipes, and also providing means for the automatic uncoupling or disconnection thereof when the car couplings are uncoupled and the cars drawn apart.

A further object of the invention is to provide a coupling of the class described equipped with automatically operated valves which control the passage of the fluids through the heads of the coupling so that when the coupling is made, the valves are automatically opened up to establish communication between the pipes of the opposite cars.

Another object of the invention is to provide a coupling head so constructed that the parts thereof can be readily repaired or replaced without the loss of the entire head, which is a feature of considerable practical importance.

Furthermore the invention provides novel means for hanging the pipe coupling heads directly from the car couplings so as to insure a positive and accurate coupling for the pipe couplings while at the same time permitting the latter to couple with high or low cars, adjust themselves to various positions to suit the curves of the track and also admitting of a ready uncoupling when the cars are moved apart.

With these and many other objects in view, which will more readily appear as the nature of the invention is better understood, the same consists in the novel construction, combination and arrangement of parts herein- after more fully described, illustrated and claimed.

The essential features of the invention involved in carrying out the objects above indicated are necessarily susceptible to structural change without departing from the scope of the invention, but a preferred embodiment thereof, is shown in the accompanying drawings, in which—

Figure 1 is a side elevation of an automatic pipe coupling for cars constructed in accordance with the present invention and showing one of the pipe coupling heads suspended from a car coupling. Fig. 2 is a top plan view of the complete coupling, showing the pair of companion coupling heads interlocked in their coupled relation. Fig. 3 is a vertical cross-sectional view on the line 3—3 of Fig. 2. Fig. 4 is a detail in perspective of one of the pipe coupling heads. Fig. 5 is a detail sectional view on the line 5—5 of Fig. 2, showing a form of separable joint for detachably uniting the pipe shoe to the end bar portion of the head to facilitate repairs or replacing of parts.

Like references designate corresponding parts in the several figures of the drawings.

In carrying out the invention the same includes in its general organization a pair of duplicate companion pipe coupling heads 1—1 designed to be carried with the car-coupling heads, and adapted to automatically couple and uncouple simultaneously with the coupling and uncoupling of the cars. These coupling heads 1—1 are duplicates in design and construction and are arranged in rights and lefts so as to properly register in the coupling operation. Hence a description of one of the pipe coupling heads will suffice for the other.

The present invention contemplates an improvement in the means for hanging the individual pipe coupling heads from the car couplings and to accomplish this, each head 1 has projected from what may be termed the inner or closed end thereof, a draw bar section 2 slidably mounted in the guiding bore 3 of a supporting box 4, arranged in a horizontal position and having a rigid fastening connection 5 with the lower end of a vertically arranged hanger bracket 6, the upper end of which bracket has a rigid fastening connection 7 with the underside of the draw bar 8 of the car coupling head 9 at the bottom of which head 9, as at 10, is connected the upper end of an auxiliary hanger chain 11 the lower end of which chain is connected, as at 12, with the upper side of one of the side members of the pipe coupling head 1. This provides an auxiliary flexible support for the pipe coupling head, while the hanger bracket 6 maintains the necessary permanent relation between the car coupling and the pipe coupling to insure the proper coupling and uncoupling of the latter. Free longitudinal movement of the pipe coupling head 1 is provided for by the sliding mounting of the draw bar section 2 in the box 4, and said section 2 is provided therein with a longitudinally disposed slot 13 receiving a retaining pin 14 fitted in the outer end of the box 4, and between the base of the box 4 and the inner end of the draw bar section 2 is interposed a draft spring 15, which yieldingly projects the pipe coupling head to a proper working position and also cushions the impact of the coupling action.

A distinctive feature of the invention resides in the specific construction of the individual pipe coupling heads. Each of the latter may be termed a bifurcated pipe coupling head somewhat in the form of a U-shaped body primarily comprising a pipe shoe 16 constituting one side member of the head and a coupling arm 17 constituting the other side member of the head and lying opposite and in spaced relation to the inside coupling face 18 of the shoe 6. Preferably the coupling arm 17 is of materially less width than the shoe 16 and is located centrally between the top and bottom edges of the latter, as best shown in Fig. 3 of the drawings. Also the arm 17 is preferably formed integrally with the closed inner end bar member 19 of the head, which member however preferably has a separable joint connection with the shoe 16 so that in case of damage to either the shoe or the coupling arm part of the head either of said parts may be replaced without throwing away the other. This separable joint connection may be of any practical construction, but may consist of a stout tenon 20 on the end bar 19 snugly registering in a correspondingly shaped mortise 21 formed in the inner end of the shoe 16, and at transverse joint bolt 22 coupling together these matching elements.

As above indicated the pipe shoe 16 is provided at its inner side with a wide coupling face 18 and at its outer end is formed with a V-shaped guard fork 23 having the upper and lower reversely inclined guiding fingers 24 adapted to coöperate with and take over the inner end bar 19 of the companion shoe, thereby serving to correct the vertical position or elevation of the two shoes according to variations in the height of the couplings on the opposite cars. Also, the pipe shoe 16 is further provided in its outer side or face with a longitudinally disposed keeper groove 25 adapted to receive and retain therein the flat pressure spring 26 arranged, normally, in spaced relation to the coupling arm 17 at the inner side thereof and secured fast at its outer end as at 26ª to said coupling arm at or near the outer end of the latter. When the companion heads are brought into coupled relation, the springs 26 serve the double function of holding the coupling faces 18 in tight registering engagement and also lock the companion heads against relative vertical displacement.

In addition to the elements enumerated the pipe shoe 16 of each coupling head, at a point intermediate the ends of the shoe body is pierced by a vertically arranged series of circulating ports 27, 28 and 29, designed respectively for the passage therethrough of the air for the air brake and signal pipes and the steam for the steam or heating pipes. These ports open through the inside coupling face 18 of the shoe and are surrounded at this point by the rubber or equivalent contact gaskets 30 fitted in suitable seats 31 cored out in the face 18. These gaskets are designed to have a tight registering contact with the corresponding gaskets of the companion shoe so as to maintain a fluid tight joint between the shoes at the points where the several circulating ports are brought into communication. The outer ends of the circulating ports which open through the outer face of the pipe shoe 16 have fitted therein the nipple connections 32, 33 and 34 respectively for the air brake pipe 35, the signal pipe 36 and the steam pipe 37, but it will of course be understood that the arrangement or location of these pipes may be varied to suit the train equipment. The several circulating ports 27, 28 and 29 of the pipe shoe 16 intersect an upright valve chamber 38 piercing the shoe vertically and accommodating therein a rotary valve plug 39 pierced by a plurality of ports 40, 41 and 42 adapted to communicate simultaneously with the several ports 27, 28 and 29, and also the said valve or valve plug 39 cuts off or closes all of said ports at the same time. The upper end of the valve plug 39 has rigidly fitted thereto one end of a swinging valve arm 43 arrested in the closed position of the valve against a stop 44 on the shoe, and having a shouldered engaging end 45 adapted to be engaged by the beveled or pointed strike nose 46 of an upstanding tappet bracket 47 arranged on and above the coupling arm 17 of the companion shoe. The tappet bracket 47 of each coupling head is provided with a supporting base 48 which is bolted or otherwise detachably fastened to the upper side of the coupling arm 17 so that the same may be readily replaced when broken. When the opposing coupling heads come together the tappets 47 engage the valve arm 43 and thereby automatically establish communication through the opposing shoes 16 by the opening of the valves. When the coupling heads are drawn apart the valves remain open (thereby setting the brakes in case of accident), until closed by the attendants.

To facilitate and assist in the coupling operation, the coupling arm 17 of each head is provided at its outer extremity with a beveled guide nose 49 which serves to start the spring 26 into the keeper groove 25.

I claim—

1. In an automatic pipe coupling for cars, the combination with a car coupling, of a vertically arranged hanger bracket having a rigid connection with the car coupling draw bar and carrying a supporting box, of a pipe coupling head provided with a slotted draw bar section slidably fitting in said box, a retaining pin fitted to said box and engaging said slotted draw bar section, a draft spring for said draw bar section, and an auxiliary flexible hanger connected with the car coupling head and with the pipe coupling head.

2. In an automatic pipe coupling for cars, a pipe coupling head comprising a bifurcated body having a pipe shoe provided with pipe connections, and a coupling arm lying opposite and in spaced relation to the inside coupling face of the shoe, said coupling arm carrying at its inner side a pressure spring.

3. In an automatic pipe coupling for cars, a pipe coupling head having a pipe shoe provided with pipe connections, and with a keeper groove in its outer side, said head being further provided with a coupling arm lying opposite the inside face of the shoe and carrying at its inner side a pressure spring having a slidably interlocking engagement with the keeper groove of the companion shoe.

4. In an automatic pipe coupling for cars, a pipe coupling head having a pipe shoe provided with pipe connections, a V-shaped guard fork at its outer end, and a longitudinal keeper groove in its outer side, said head being further provided with a coupling arm lying opposite the shoe and carrying at its inner side a longitudinally disposed off-standing pressure spring having a slidable interlocking engagement with the keeper groove of the companion shoe.

5. In an automatic pipe coupling for cars, a pipe coupling head having a pipe shoe provided with a series of circulating ports for the various pipes of the train, and a valve chamber intersecting said series of ports, a rotary valve plug mounted in the valve chamber and carrying at its upper end a swinging valve arm, and an off-standing tappet carried by the coupling head and arranged to engage the valve arm of the companion pipe shoe.

In testimony whereof I hereunto affix my signature in the presence of two witnesses.

WM. A. ROBERTSON.

Witnesses:
JOHN STOCKBURGER,
J. HOWARD BEBER.